Sept. 28, 1937.  C. M. STREYFFERT  2,094,309
AUTOMATIC DRAFT REGULATOR FOR BOILERS
Filed June 20, 1934  2 Sheets-Sheet 1

C. M. Streyffert
INVENTOR

By: Marks & Clerk
ATTYS.

Sept. 28, 1937.  C. M. STREYFFERT  2,094,309
AUTOMATIC DRAFT REGULATOR FOR BOILERS
Filed June 20, 1934  2 Sheets-Sheet 2
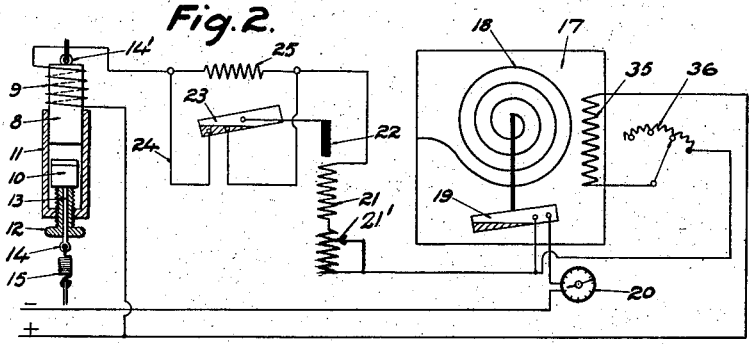
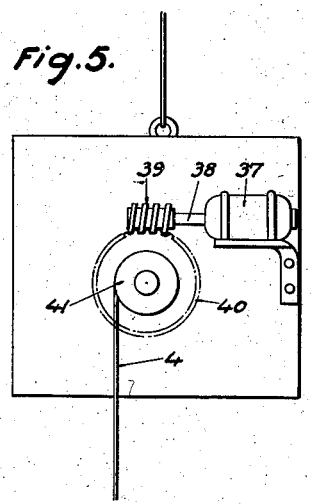
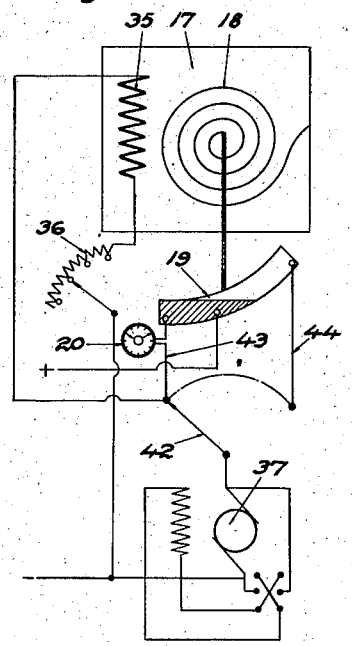
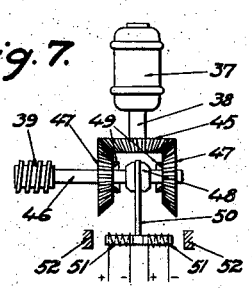
C. M. Streyffert
INVENTOR
By: Marks & Clerk
Attys.

Patented Sept. 28, 1937

2,094,309

UNITED STATES PATENT OFFICE 2,094,309

AUTOMATIC DRAFT REGULATOR FOR BOILERS

Carl Magnus Streyffert, Norrkoping, Sweden

Application June 20, 1934, Serial No. 731,558
In Sweden June 21, 1933

7 Claims. (Cl. 236—9)

This invention relates to apparatus for controlling the water temperature or pressure in heating boilers for solid fuels in order to control the air supply to the boiler and thus the heat effect in dependence upon the temperature of the building, premises, room, greenhouse et cetera to which heat is to be supplied from the boiler.

The main feature of the invention is that an electromagnetic driving device is adapted to actuate a member controlling the air supply, which member may consist of a flap or valve, to increase or reduce the air supply, and that in the room or other premises switches are provided in the circuit of this driving device, which switches are controlled automatically by means sensitive to temperature, for example thermostats or contact thermometers, so that according to the temperature conditions the driving device is actuated so as to close or open the member controlling the air supply or draft.

The driving device is either embodied as an electromagnet with the magnet adapted to actuate a chain, connected with the draft flap of the boiler, the magnet preferably being connected with one, and its armature with the other part of the two-divided motion transmission chain connected with the flap, or an electromotor may be used for actuating the chain. In the chain there is, dependent or independent upon the driving device, mounted the normal controller in connection with a thermostat located in the boiler for adjusting the draft flap according to the temperature of the boiler. The driving device is preferably mounted in a housing, with the upper part of which one part of the chain is connected and in the lower part of which the other part of the chain is adapted to enter so as to be connected with the magnet armature movable in the housing and with a transmission driven by the motor respectively.

The further essential features of the invention will be clear from the following detailed description, reference being made to the accompanying drawings.

Some embodiments of the invention are illustrated in the accompanying drawings, in which Fig. 1 is a diagrammatic assembled view of a boiler using solid fuels for heating buildings of various kinds, for example greenhouses and provided with the control device according to the invention, the said device having the shape of an electromagnetic driving device.

Fig. 2 is a diagrammatic view of the control device in the shape of an electromagnet shown in section with some parts of the magnet housing broken away and an example of a switch diagram for actuating the same electrically by means of a room thermostat.

Fig. 5 is a detail of Fig. 1 with a control device embodied as an electric motor.

Fig. 6 is a switch diagram showing the device for actuating the said control device according to Fig. 5.

Fig. 7 is a modification of the device according to Fig. 5.

Figure 1:
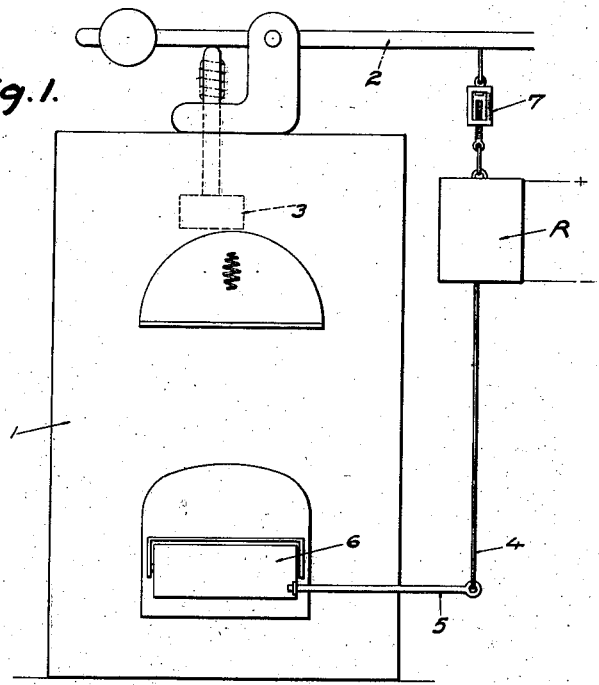

In the figures of the drawings the same reference letters refer to the same details.

The reference numeral 1 indicates part of the boiler, 2 the weight-loaded lever actuated by an optional thermostat 3 mounted therein, the movement of the said lever, which movement is caused by the thermostat, being transmitted to the draft flap 6 of the boiler by means of the chain 4 or the like and the lever 5; the system is arranged in such a way that on moving the chain downward the flap is brought to the closing position. In the chain 4 there is, in a known way, coupled a draft governor or adjusting device 7, preferably in the shape of a frame or the like controllable by a screw, by means of which frame the closing of the draft flap is completely or partly controlled in view of the required maximum temperature of the water of the boiler.

According to the invention there is moreover in the chain connected an additional control device R, see Fig. 5, comprising an electromagnetic driving device adapted to actuate the chain 4 to move the flap 6 in one direction according as the temperature conditions of the building to be heated require a change of the draft and, thus, of the heat effect.

According to Figure 2 the control device R consists of an electromagnet 8, preferably embodied as a lifting-magnet with closed magnet field; the coil of the magnet is indicated by 9 and the armature 10 of which is movable in the magnet housing 11, with which the magnet is rigidly connected. By means of the screw 12 or any other suitable device the range of motion of the armature may be controlled. On the armature spindle 13 projecting below the housing 11 and on the upper end of the housing or the magnet there are provided eyes 14, 14' or the like for securing the chain 4. In order to prevent violent pulls in the system and with respect to the smaller attraction force of the electromagnet when the air gap is larger, it may be suitable to connect a resilient or yielding device to the motion transmitting device of the draft flap. This spring device may for example be arranged in such a way as is indicated at 15 in Figure 2.

If suitable, the spindle 13 may be embodied telescopically or be made controllable with respect to its adjustment in another way, so that, when necessary, it may be lengthened or shortened, and it may be placed in another way than the one shown. If desired, the adjusting device or governor 7 and the control device R may be connected as a unit and assembled in a common casing. Of course, the device controlling the air supply may consist of a valve or the like instead of the draft flap.

Instead of an electromagnet there may, of course, be used a solenoid for actuating an iron core connected with the chain, the said iron core being embodied in a suitable way. The intensity of the current to the solenoid may in this case be controlled by controllable resistances.

The control of the current supply to the electro-magnet takes place automatically, in the most suitable way, under the action of an optional thermostatic device located within the premises to be heated and adapted to actuate a suitable switch located in the circuit. Figure 2 shows an example hereof, it being presumed, that the thermostat shown may be replaced by another suitable thermostat, also for example by a so-called contact thermometer.

In Figure 2 the reference numeral 17 indicates the thermostat housing, 18 the thermostat element, and 19 a tipping mercury switch connected with one end of the latter, the said switch being able to be replaced by another suitable switch, if desired. In the circuit for the thermostat 17 there is connected a clockwork or other timing device 20, by means of which the current to the magnet 8 is kept interrupted during a certain time of the 24 hours, for example during the night, and also a relay 21. The closing and the breaking of the current causes the relay core 22 to move to actuate a tipping mercury switch 23 or the like connected with a shunt 24. The reference numeral 25 indicates a resistance.

In order that the said resistance 25 shall not be connected immediately at a current supply, the relay is provided with an impedance 21' to retard the displacement of the mercury. It is to be observed that an impedance for the said purpose may also be provided at the switch.

Figure 2 shows the position, in which the temperature of the room has reached or exceeds the maximum permissible temperature, for example 19° C., and consequently the current to the magnet coil 9 is interrupted and the draft flap 6 of the boiler is actuated to reduce the air supply. It is presumed that the normal boiler draft governor 3 and 7 is adjusted for the suitable maximum temperature of the water of the boiler, for example 50 degrees C. If the temperature sinks below 19° C., the switch 19 is reversed under the action of the thermostat so as to provoke contact in the circuit. When the circuit 24 is short-circuited by the switch 23, the greatest possible current intensity is obtained for attracting the armature 10 and thus partly or fully opening the draft flap 6 until after a few seconds, when the core 22 has been actuated to tip the switch 23, the contact is interrupted by the latter and the current is conducted through the resistance 25.

Consequently, the current consumption for retaining the armature is considerably decreased. If desired, the devices 21 to 25 may be omitted and the electromagnet be actuated by a continuous current.

The thermostat 17, Figure 2, is preferably provided with a built-in heat resistance 35, controlled by the rheostat 36 which is connected in the circuit and adapted to be actuated automatically in the manner according to the Figure 2. If thus the thermostat 17, 18, as indicated, is set for 19° C. and the temperature of the room in question is for example 17° C. the control circuit, being closed, becomes interrupted at about 18° C. due to the transmission of heat from the resistance to the thermostat element 18. The resistance and the thermostat element having cooled to a proper extent, after about 20 or 30 minutes, the circuit is again closed if the room temperature is below 19° C. and then, due to the action of the heat resistance on the thermostat, the circuit is again interrupted after about 20 or 30 minutes. This goes on until the room temperature becomes 19° C. If the temperature sinks during this time the procedure is again repeated. It should here be observed that the period comprised by the current supply becomes shorter the nearer the room temperature approaches the desired temperature.

By means of the rheostat 36 the effectiveness of the heat resistance is increased or decreased and thus also the period comprised by the current supply. By this the plant may be adjusted with respect to the type and size of the boiler, to the draft in the chimney, and also with respect to the season.

The advantage of this device is that overheating of the heat elements is prevented and a practically constant temperature in the rooms is secured. The temperature of the water in the boiler cannot rise so much that a subsequent heating amounting to a few degrees can take place, but the device is always adjusted to a temperature suitable to the desired room temperature. During the 30 minutes indicated above, when the current is interrupted or the draft flap 6 is in the position for reduced supply of air, heat from the heat elements has sufficient time to act so as to increase the room temperature and prevent unnecessary current supply with ensuing overheating.

Figure 3:
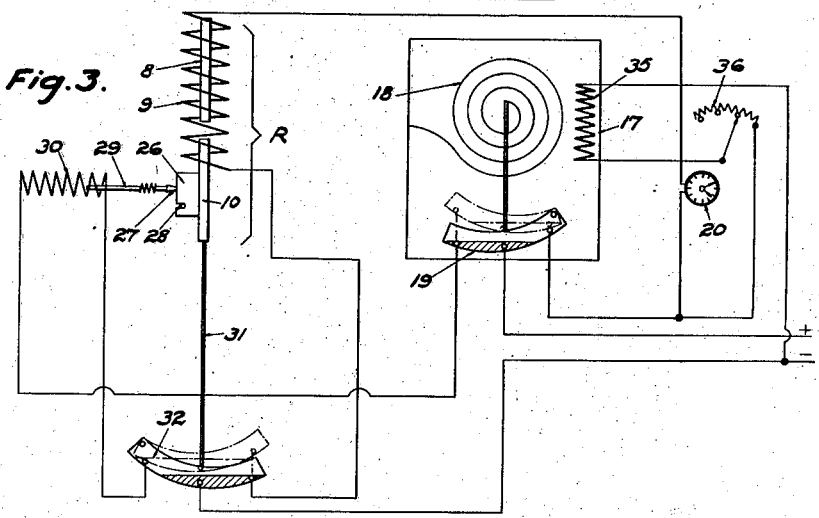
Fig. 3 is a switch diagram for the instantaneous breaking and closing of the current, in connection with devices according to Figs. 1 and 2.

Figure 3 shows diagrammatically a device and a switch diagram for provoking only instantaneous current supplies, the current consumption being thereby further reduced. The armature 10 is here preferably provided with a guide surface in the shape of a bar or the like, indicated at 26, against which the end of a resilient pawl or ratchet 27 is slidable. When attraction takes place between armature 10 and magnet 8, the ratchet 27 will engage either a recess 28 in the bar, or below the bar, or possibly below the armature itself, in order to retain the armature in raised position. The ratchet 27 is connected either with an electromagnet or with the core and the armature 29 of a solenoid 30, in the circuit. When energized this solenoid effects the release of the armature 10 from the engagement due to the attraction of the core. The armature has also a link connection 31 with a tipping mercury switch 32 in such a way that, when the armature is in its repelled position, contact is provoked in the circuit of the coil 9, and, when the armature is in an attracted position, contact is made in the circuit of the coil 30.

In the circuit of the magnet 8 there is connected a clockwork or the like 20, by means of which the current is held interrupted during a certain period of the 24 hours (during the night).

It is supposed that the thermostat shall control and maintain during the day a temperature in the room of, for example, 19° C. Figure 3 shows in full lines how the thermostat, when the temperature is 19° C., has actuated the switch 19 so that the contact in the circuit of the magnet 8 is interrupted, but closed in the circuit of the coil 30. The armature 10 has by its ensuing repulsion and actuation of the switch 32 effected contact in the circuit from the magnet 8, but interrupted the contact in the circuit from the coil 30. Thus the draft flap has been moved toward the closing position for reduced supply of air. If the temperature sinks below 19° C. a reversion of the switch 19 effects contact in the circuit of the magnet 8, and therefore the attracted armature is retained by the ratchet 27 and tips the switch 32 to the dot-and-dash line position during its movement so that the circuit to the magnet coil 9 is interrupted again. The draft flap is thus now in position for increased supply of air. If the temperature rises to 19° C. again the switch 19 is tipped to the position indicated by full lines so that the coil 30 is supplied with current and the ratchet 27 is brought out of engagement, and therefore the armature 10 falls down and tips the switch 32 back again. The circuit is interrupted again. The procedure is repeated due to the occurring changes of the temperature during short alternate current supplies. During the intervals the current is totally switched off, thus involving savings of current.

Figure 4:
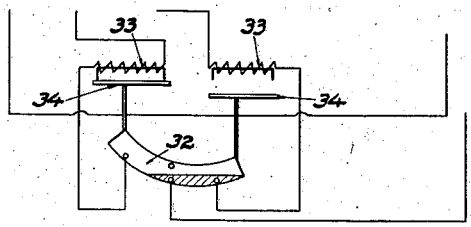
Fig. 4 is a modified detail of the last mentioned switch diagram.

Instead of being operated by the magnet 8 the switch 32 may be actuated by a relay located outside the magnet, the said relay preferably, as indicated in Figure 4, consisting of two electromagnets 33 and 33', connected in series with the coil 9 of the magnet 8 and the coil 30 respectively, the armatures 34 and 34' of the said magnets being mechanically connected with the switch 32 on each side of its central tipping point and made from hard iron so that after the current has been interrupted the respective armature is retained in its position until current is supplied to the other electromagnet. The mode of operation corresponds to the one described above.

The resistance 35 and the rheostat 36 are arranged and act in a manner corresponding to that shown in Figure 2.

In Figure 5 the electromagnetic driving device R of Fig. 1 is shown embodied as a motor, and Fig. 6 shows diagrammatically a switch diagram for the same.

The shaft 38 of the motor 37, in Fig. 5, is by means of a worm 39 and a worm wheel 40 adapted to actuate a drum 41, on which the chain or link 4 is secured so as to be wound up. It is, however, presumed, that the connection between chain and motor may be effected by any other suitable transmission. The motor is embodied as a reversible motor, and is so arranged, that, after having been rotated to a proper extent in order respectively to wind up or wind off the chain to sufficiently open or close the draft flap, it automatically actuates the circuit breaker 42, Fig. 6, so as to reverse its position so that the current through the circuits 43 and 44 respectively is interrupted and the motor stops.

If the room temperature sinks below the fixed number of degrees, for example 19 degrees C., so that the switch 19, Fig. 6, tips to close the current through the circuit 43, the motor is brought to rotate in the desired direction for shortening the chain, until after a predetermined number of revolutions it turns the circuit breaker to contact with the circuit 44 when the current is interrupted and reversion of the poles takes place. If the temperature rises above 19° C. the motor acts in corresponding manner but in the opposite direction. Figure 6 shows the switch diagram for D. C., for A. C. the diagram is modified in a known manner.

Also here resistances 35 and connected parts are provided for the same purpose as stated before, as are clockworks 20 with necessary connections.

Instead of making the motor reversible it may be made to act only in one direction, and one may arrange a reversing device in the transmission shown by way of example in Figure 7.

The motor-shaft has a conical toothed wheel 45 permanently meshing with two conical toothed wheels 47 which are freely mounted, but not axially slidable on the worm-shaft 46. Between the wheels 47 there is provided an axially slidable, but non-rotatable coupling member 48, which is adapted to engage coupling surfaces 49 on the wheels, and which is so dimensioned that it cannot lock one toothed wheel until the other has been released. The coupling may be embodied as a friction or claw coupling, and on the coupling member 48 there is loosely mounted a claw- or eye-provided arm 50 of electro-magnets 51 with rigid armatures 52. The current supply to the magnets is controlled automatically by the electromotor by means of the breaker or reverser 42, Fig. 6. The mode of operation is clear from the foregoing. If desired, a single magnet 51 may be used, and the other magnet may be replaced by a spring.

It might be thought that the motor only acts on the chain in one direction, whereas the chain, by the weight of the flap and connected parts, is made to move in the other direction, in which case provision should be made to lock the chain after the motor has rotated a predetermined number of revolutions, and until changes of temperature demand motion in the last-mentioned other direction.

By the stated additional control device according to the invention a very uniform temperature in the rooms is obtained, without the need of a permanent readjustment of the adjusting device of the common draft governor of the boiler. On tests the temperature variations have lain within ⅓° C.; rather considerable savings in fuel have been obtained by the fact that the temperature in the rooms at certain periods need not be very high and that the temperature may be lowered during the night. Due to the construction the control device becomes particularly important in greenhouses. In this case the draft flap should be able to be locked in a certain minimum position for example by the adjusting device 7 so that, if there were any interruption of the current during the night, the draft flap cannot be closed to such an extent that there would be a risk of too low a temperature. At all events the draft flap should let in so much air as will be sufficient to maintain the fire. If desired, the draft flap may be provided with an adjusting screw so as to obtain some play in the closed position.

Of course, modifications of the devices shown are possible without going beyond the scope of the invention.

Having now described my invention, what I claim as new and desire to secure by Letters Patent is:

1. Apparatus for controlling the water temperature or the pressure in a heating boiler provided with damping means and a draft governor depending upon the temperature or the pressure of the boiler, said apparatus comprising adjusting means for said governor consisting of a motion transmission between said governor and said damping means, and an electromagnet inserted in said transmission, whereby said electromagnet actuated by the room temperature upon its current being interrupted, actuates the damping means in one direction, while on the current being closed actuates the damping means in the opposite direction to change the temperature of the water or the pressure in the boiler, transmission being provided with a two-part chain between the ends of which the electromagnet is inserted.

2. Apparatus for controlling the water temperature or the pressure in a heating boiler provided with damping means and a draft governor depending upon the temperature or the pressure of the boiler, said apparatus comprising a connecting device between said governor and said damping means, adjusting means for said governor consisting of an electromagnetic drive with a chain actuated by the room temperature, said electromagnetic drive including an electromagnet secured to one part of the chain, an armature movable relatively to the electromagnet and secured to another part of the chain, the two elements adapted for relative movement to alter the effective length of the chain, whereby said electromagnet is adapted to adjust the draft governor by the room temperature to change the temperature of the water or of the pressure in the boiler.

3. An apparatus for controlling the draft in a heating boiler, provided with damping means, a draft controller depending upon the temperature or the pressure of the boiler and a motion transmission, including a draft chain, between said controller and said damping means, an independently working electromagnet contained in said draft chain, said electromagnet influenced by the room temperature being adapted to directly actuate said motion transmission in such a manner that when the current to the electromagnet is closed and interrupted respectively the length of the motion transmission becomes correspondingly adjusted in order to obtain a correspondingly adjusted boiler temperature or pressure.

4. In an apparatus according to claim 3, a stopping device for the armature of the electromagnet which is so arranged that after attraction of the armature the same is automatically brought to a position to stop the armature, a thermostatically actuated switch adapted to release said armature from the stopping position, switches for the circuit of the electromagnet adapted alternately to close, and after attraction of the armature, to interrupt the current to the electromagnet, but during this procedure to hold the current actuating the stopping device interrupted.

5. An apparatus according to claim 3, in which said chain is divided in two parts, the armature of said electromagnet being resiliently connected with one part of said chain.

6. An apparatus according to claim 3, in which the armature of said electromagnetic drive is adjustable in relation to a housing provided for the electromagnetic drive.

7. A device according to claim 3, in which the electromagnet consists of a lift magnet in operative connection with the draft governor and a chain connection between the armature of the magnet and the damping means.

CARL MAGNUS STREYFFERT.